United States Patent [19]
Adachi et al.

[11] Patent Number: 5,699,132
[45] Date of Patent: Dec. 16, 1997

[54] CATHODE-RAY-TUBE DISPLAY DEVICE WITH SIMPLIFIED FASTENING STRUCTURE AND ASSEMBLY METHOD

[75] Inventors: Ryoto Adachi, Nagaokakyo, Japan; Christopher James Reith, East Lothian, Scotland

[73] Assignee: Mitsubishi Denki Kabushiki Kaisha, Tokyo, Japan

[21] Appl. No.: 364,466

[22] Filed: Dec. 27, 1994

[30] Foreign Application Priority Data

Dec. 27, 1993 [JP] Japan ................. 5-332242

[51] Int. Cl.⁶ .......................... H04N 5/64; H04N 5/645; H04N 5/65
[52] U.S. Cl. ..................... 348/836; 348/825; 348/843; 361/682; 312/7.2
[58] Field of Search ........................... 348/836, 825, 348/826, 827, 839, 843, 787, 789; 361/682, 724; 312/7.2; 313/482; H04N 5/64, 5/45, 5/65

[56] References Cited

U.S. PATENT DOCUMENTS

| | | | |
|---|---|---|---|
| 3,283,072 | 11/1966 | Pestka et al. | 312/7.2 |
| 4,338,635 | 7/1982 | Haider et al. | 358/254 |
| 4,360,838 | 11/1982 | Babicz et al. | 358/248 |
| 4,644,408 | 2/1987 | Coleman | 358/254 |
| 4,820,224 | 4/1989 | Lemche | 445/23 |
| 5,054,953 | 10/1991 | Mattiolo | 483/406.1 |
| 5,299,016 | 3/1994 | Hirota et al. | 348/818 |
| 5,359,421 | 10/1994 | Maeda | 348/818 |

FOREIGN PATENT DOCUMENTS

| | | |
|---|---|---|
| 0 232 917 | 2/1987 | European Pat. Off. . |
| 0 244 238 | 4/1987 | European Pat. Off. . |
| 0 484 037 | 10/1991 | European Pat. Off. . |
| 3233734 | 3/1984 | Germany . |
| 37 13 939 | 4/1987 | Germany . |
| 89 06 630 | 5/1989 | Germany . |
| 41 28 152 | 8/1991 | Germany . |
| 4128152 | 2/1993 | Germany . |
| 61-69280 | 4/1986 | Japan . |
| 63-35085 | 2/1988 | Japan . |
| 255780 | 4/1990 | Japan . |
| 404077071 | 3/1992 | Japan .............. H04N 5/645 |
| 405183844 | 7/1993 | Japan .............. H04N 5/645 |

*Primary Examiner*—Thomas L. Stoll

[57] ABSTRACT

A cathode-ray-tube display device has a cathode-ray tube enclosed in a front cabinet and back cabinet. The cathode-ray tube has peripheral lugs with holes. The front cabinet has front bosses with elongate members that extend backward through the holes in the lugs. The back cabinet has back bosses that extend forward and terminate in ends with front cavities, which receive the ends of the elongate members. The front cabinet is fastened to the back cabinet by screws that are driven through holes in the back bosses and into tapped holes in the elongate members. The lugs are held between the front and back bosses, thereby securing the cathode-ray tube to the front and back cabinets.

19 Claims, 13 Drawing Sheets

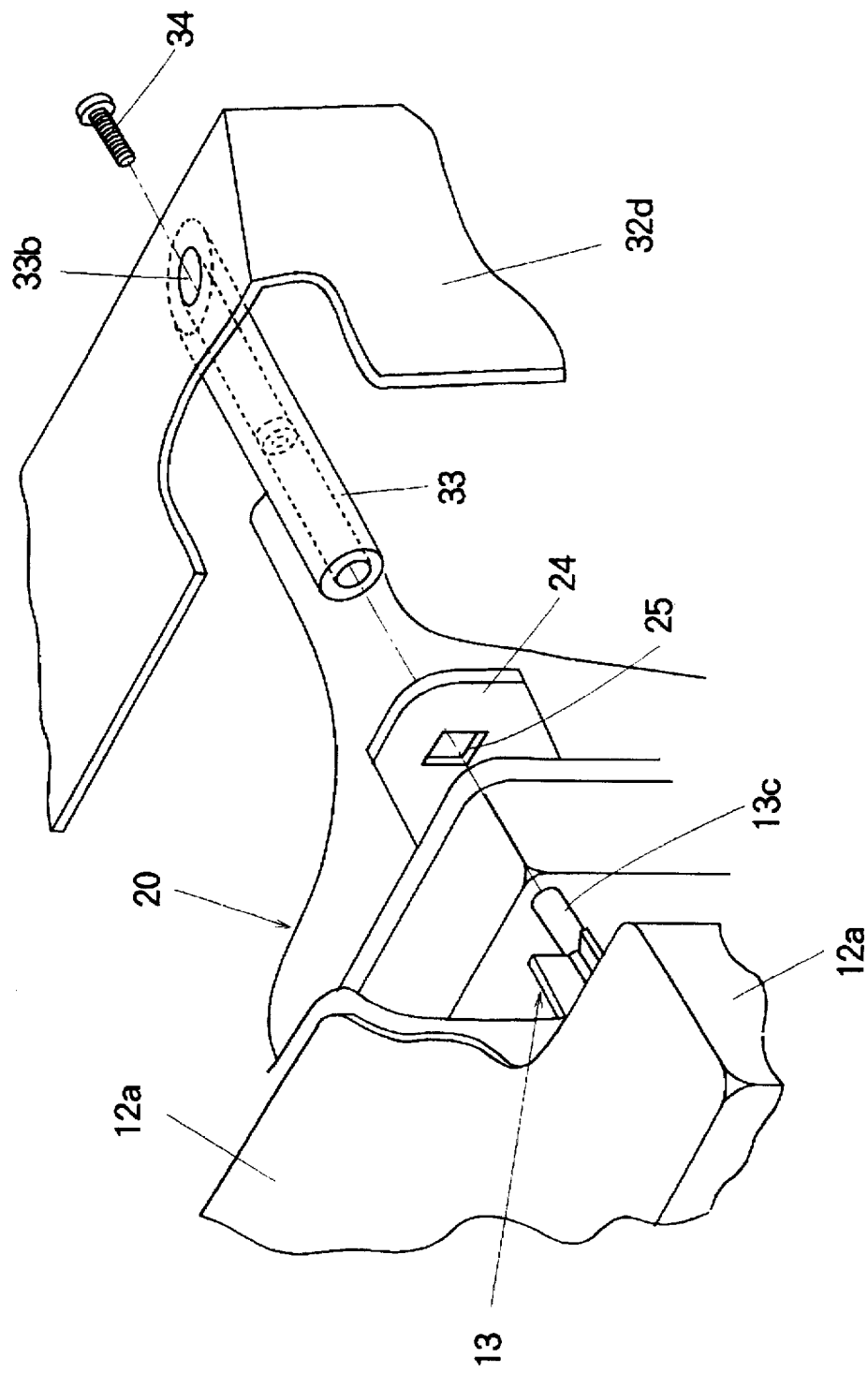

CATHODE-RAY-TUBE DISPLAY DEVICE WITH SIMPLIFIED FASTENING STRUCTURE AND ASSEMBLY METHOD

BACKGROUND OF THE INVENTION

The present invention relates to a cathode-ray-tube display device such as a television set or computer monitor, more particularly to its fastening structure and assembly method.

The display device of interest comprises a cathode-ray tube (CRT) housed in a cabinet. Referring to FIG. 16, the cabinet is of two-part construction; the two parts will be referred to as the front cabinet 1 and back cabinet 3. FIG. 16 shows the conventional fastening structure in which the cathode-ray tube 2 and back cabinet 3 are attached separately to the front cabinet 1. The front cabinet 1 has four bosses 1a disposed at its inside front corners, and four bosses 1b disposed at its inside back corners. Each of the bosses 1a and 1b 1s provided with a tapped hole to receive a screw. The cathode-ray tube 2 has four lugs 2a at its four corners, which are fastened to the bosses 1a by screws 4 inserted through holes in the lugs 2a. The back cabinet 3 is similarly attached to the bosses 1b by screws 5 inserted through holes 5a.

FIG. 17 is a partial sectional view of this conventional fastening structure, with the same reference numerals as in FIG. 16, showing the assembled state.

One problem with this conventional fastening structure is simply that there are eight screws to be driven. Although driving a screw may seem a straightforward job, it requires, for example, accurate alignment of the holes in the lugs 2a and back cabinet 3 with the holes in the bosses 1a and 1b. Particularly for the cathode-ray tube 2, which is heavy and unwieldy, The necessary alignment can be difficult. Various further problems can impede the assembly of the display device when it is manufactured: driving a screw in one corner may destroy hole alignment in another corner; the lugs 2a may slip off the bosses 1a before the screws 4 are inserted; or screws may be dropped. If dropped among electrical components inside the cabinet, the screws may be difficult to find and retrieve.

These problems also occur when the display device is disassembled for service. Furthermore, if servicing requires the cathode-ray tube 2 to be detached from the front cabinet 1, this becomes a difficult job, because as soon as one of the screws 4 is removed, the cathode-ray tube 20 loses its support at that corner.

From the standpoints of assembly and service, it would be desirable to have a simpler fastening structure that requires fewer screws and offers better support.

SUMMARY OF THE INVENTION

It is accordingly an object of the present invention to reduce the number of screws required for assembling a cathode-ray-tube display device, thereby saving time and reducing assembly costs.

Another object of the invention is to provide a secure fastening structure for the cathode-ray tube in a cathode-ray-tube display device.

Still another object of the invention is to provide a fastening structure in which the heads of screws are recessed out of sight from the surface of the cabinet.

Yet another object of the invention is to simplify the alignment of holes, and avoid loss of alignment during the assembly process.

Still another object of the invention is to provide a safe, simplified assembly method that lends itself to automation.

The invented cathode-ray tube display device comprises a cathode-ray tube, a front cabinet, and a back cabinet. The cathode-ray tube has peripheral lugs with holes. The front cabinet has front bosses with elongate members that extend backward through the holes in the lugs. The elongate members terminate in ends with tapped holes.

The back cabinet has back bosses that extend forward and terminate in ends with front cavities, which receive the ends of the elongate members. The back bosses also have inner partitions with holes. These partitions form the ends of the front cavities. Screws are inserted through the holes in the partitions and driven into the tapped holes in the elongate members, thereby fastening the front cabinet, cathode-ray tube, and back cabinet together.

The display device is preferably assembled by placing the front cabinet face-down, lowering the cathode-ray tube into place, lowering the back cabinet into place, then driving the screws.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the an from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3 is an enlarged, partially cut-away perspective view showing the fastening structure in FIG. 1;

DETAILED DESCRIPTION OF THE PREFERRED EMBODIMENTS

Embodiments of the invention will be described below with reference to the attached illustrative drawings. In these embodiment the terms "front" and "forward" will describe positions near and directions toward the viewing end of the device, where the screen of the cathode-ray tube is located. The terms "back" and "backward" will be used to describe positions near and directions toward the opposite end of the display device.

1st Embodiment

Figure 1:
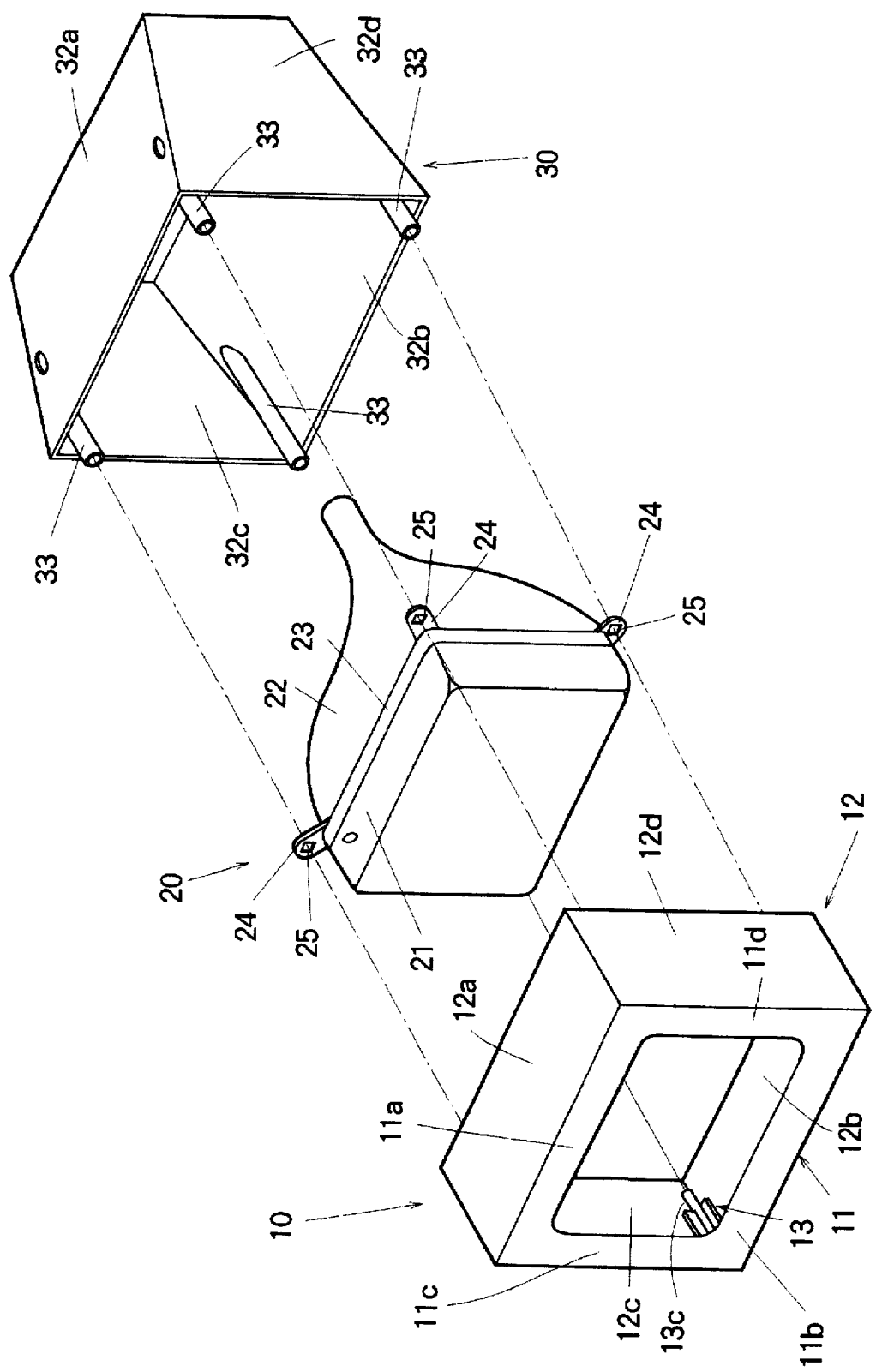
FIG. 1 is an exploded perspective view of a first embodiment of the invented display device.

Referring to FIG. 1, the first embodiment of the invention comprises a front cabinet 10, cathode-ray tube 20, and back cabinet 30. When the device is assembled, the front cabinet 10 encloses the front end of the cathode-ray tube 20, and the back cabinet 30 encloses the back end. Together, the front and back cabinets 10 and 30 enclose all but the front screen of the cathode-ray tube 20.

The front cabinet 10 has a rectangular frame-shaped front face 11 comprising a top part 11a, bottom part 11b, and side parts 11c and 11d. The front cabinet 10 also has a top panel 12a, bottom panel 12b, and side panels 12c and 12d that extend backward from the upper edge, lower edge, and side edges of this front face 11. These are all formed from plastic by unitary molding. The front cabinet 10 furthermore has four front bosses 13 attached to the top part 11a and bottom part 11b of the front face 11, near their front inside corners. These front bosses 13 face backward, and have cylindrical elongate members 13c that extend in the backward direction.

The cathode-ray tube 20 comprises a faceplate 21, a funnel 22, and a metal rim band 23 that wraps around the cathode-ray tube 20 at the interface between the faceplate 21 and funnel 22, creating a projection outward from the funnel 22. Metal mounting lugs 24 are attached, by welding for example, to the rim band 23 at the four corners of the faceplate 21. The lugs 24 are provided with holes 25. The holes 25 need not be circular but may have an arbitrary shape; in the present embodiment they are square. The holes 25 in the lugs 24 are aligned with the elongate members 13c of the front bosses 13.

Figure 2:
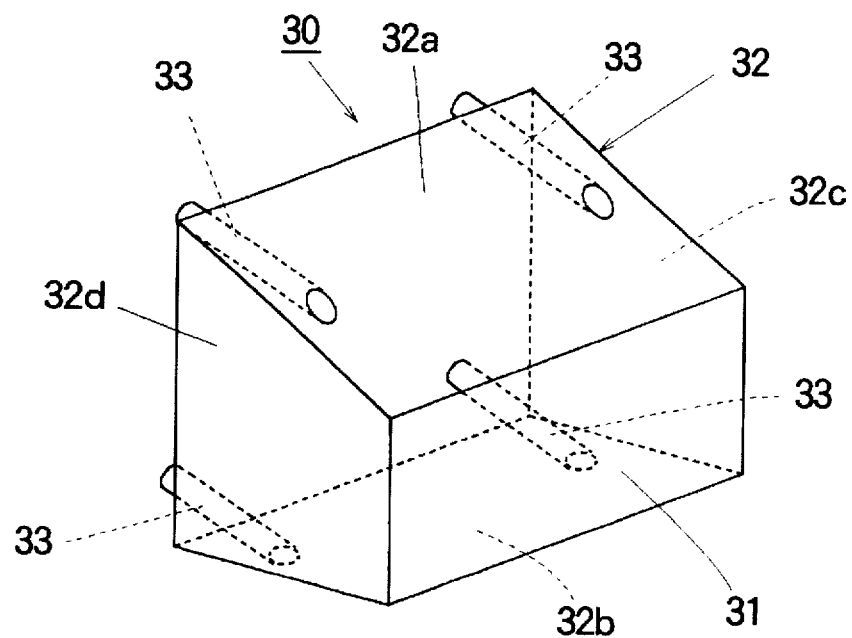
FIG. 2 is a perspective view of the back cabinet as seen from the rear, showing the positions of the attached bosses.

Referring to FIG. 2, the back cabinet 30 comprises a flat rectangular back panel 31, a top panel 32a that extends forward and upward from the upper edge of the back panel 31, a bottom panel 32b that extends forward and downward from the lower edge of the back panel 31, and side panels 32c and 32d that extend forward from the side edges of the back panel 31. The back cabinet 30 furthermore has four back bosses 33 that are attached to the top panel 32a and bottom panel 32b and extend forward.

Referring again to FIG. 1, when the display device is assembled, the front edges of the top panel 32a, bottom panel 32b, and side panels 32c and 32d of the back cabinet 30 meet the back edges of the top panel 12a, bottom panel 12b, and side panels 12c and 12d of the front cabinet 10. As indicated in FIG. 1, the back bosses 33 are aligned with the elongate members 13c of the front bosses 13, and with the holes 25 in the lugs 24.

FIG. 3 is a partial cut-away and exploded view of one corner of the display device, showing the alignment of the elongate members 13c and back bosses 33. When the display device is assembled, the elongate members 13c are inserted through the holes 25 in the lugs 24 and into front cavities in the back bosses 33, and are secured by screws 34 inserted through the back bosses 33 from the rear.

Figure 4:
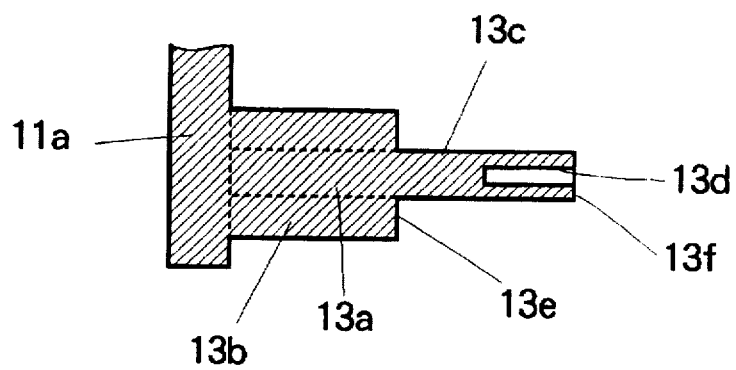
FIG. 4 is a sectional view of one of the front bosses in FIG. 1.

FIG. 4 shows a side sectional view of one of the front bosses 13. Each front boss 13 comprises a stem 13a surrounded by strengthening ribs 13b. The elongate member 13c extends backward from the stem 13a and terminates in a back end 13f with a tapped hole 13d to receive the screw 34 shown in FIG. 3. The back ends of the ribs 13b form a seating surface 13e against which one of the lugs 24 will rest.

Figure 5:
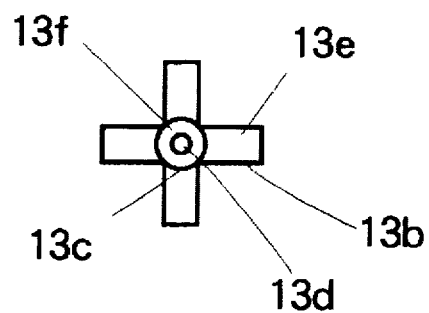
FIG. 5 is an end view of the front boss.

FIG. 5 shows an end view of this front boss 13, looking from the back toward the front so that the tapped hole 13d in the back end 13f is visible. There are four ribs 13b, so the seating surface 13e consists of four parts.

Figure 6:
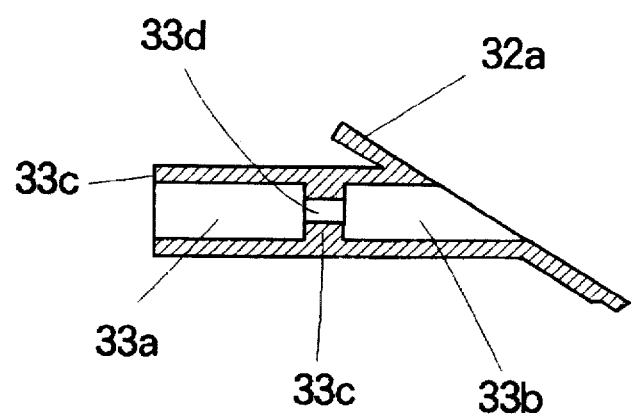
FIG. 6 is a sectional view of one of the back bosses in FIG. 1.

FIG. 6 shows a side sectional view of one of the back bosses 33. Each back boss 33 terminates in a cylindrical front cavity 33a at its front end, and has a cylindrical back cavity 33b at its back end. These two cavities are separated by an inner partition 33c having a hole 33d for the screw 34 in FIG. 3. The front cavity 33a preferably has a diameter just slightly larger than the diameter of the elongate member 13c of the front boss 13, so that the elongate member 13c will fit fairly snugly into the front cavity 33a. The back end of the back boss 33 is attached to, for example, the top panel 32a of the back cabinet 30.

Figure 7:
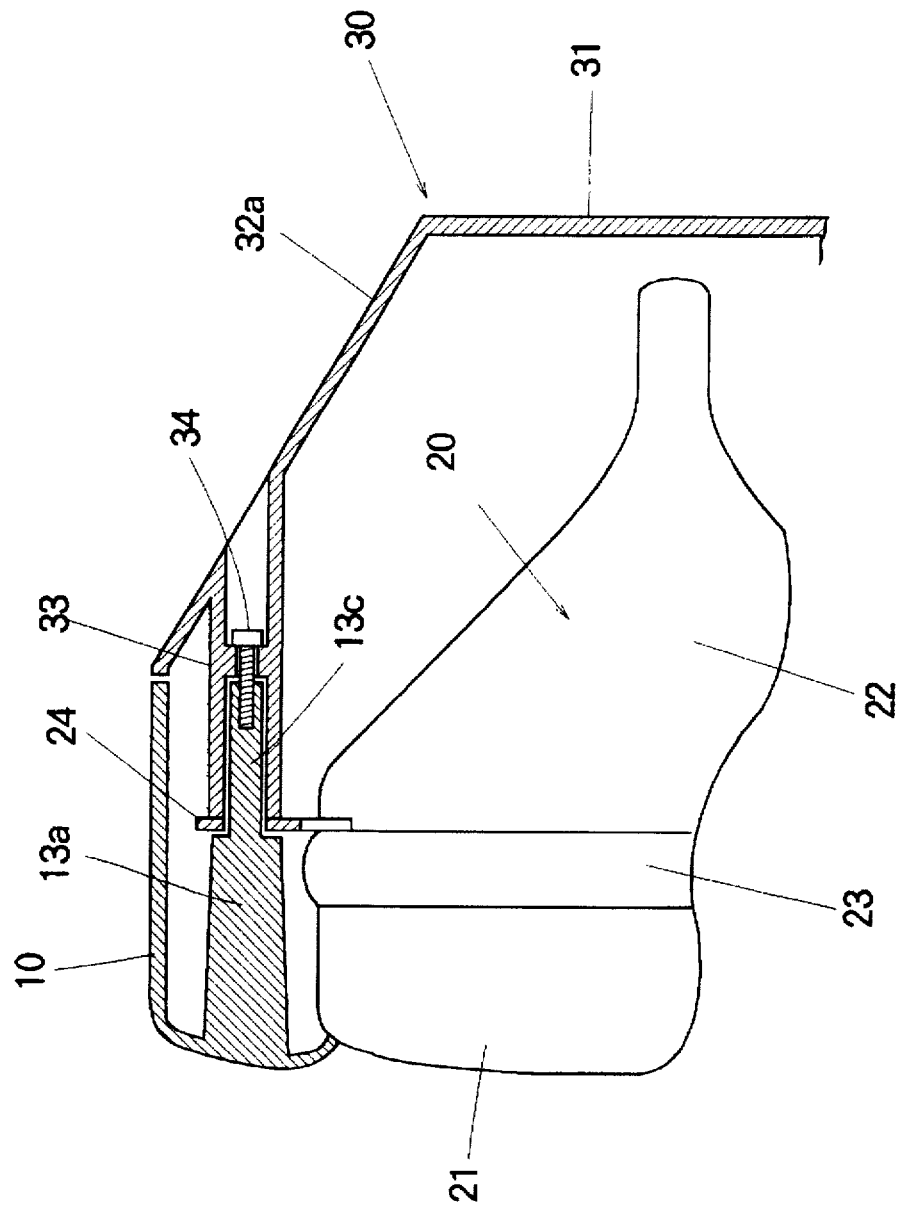
FIG. 7 is a sectional view showing the invented display device in its assembled state.

FIG. 7 shows the assembled state of one corner of the display device. The elongate member 13 has been inserted through the hole in the lug 24 and is secured by the screw 34, which thereby fastens the back cabinet 30 to the front cabinet 10. Specifically, the seating surface of the front boss 13 is in abutment with and pressed against the front surface of the lug 24, and the front end of the back boss 33 is in abutment with and pressed against the back surface of the lug 24. The lug 24 is therefore held tightly between the front end of the back boss 33 and the seating surface of the front boss 13, so that the cathode-ray tube 20 is also firmly secured to the two cabinets.

One advantage of the invented display device is that the heads of the screws :34 are recessed inside the back cavities of the back bosses 33, where they are substantially out of sight and cannot rub against external objects.

Another advantage is that the screws 34 do not have to bear the weight of the cathode-r&y tube 20 directly. The pressure of this weight is exerted by the lugs 24 on the bases of the elongate members 13c. It cannot deform the threads of the screws 34, so the screws 34 can be easily driven and removed.

The front bosses 13 that support the weight of the cathode-ray tube 20 are strengthened by the ribs 13b, and since their elongate members 13c fit snugly inside the back bosses 33, the back bosses 33 provide additional structural strength.

A further advantage is that even when all screws 34 and the back cabinet 30 are removed, the front bosses 13 continue to provide support for the cathode-ray tube 20. This can simplify the job of removing the cathode-ray tube 20 for servicing.

Figure 8:
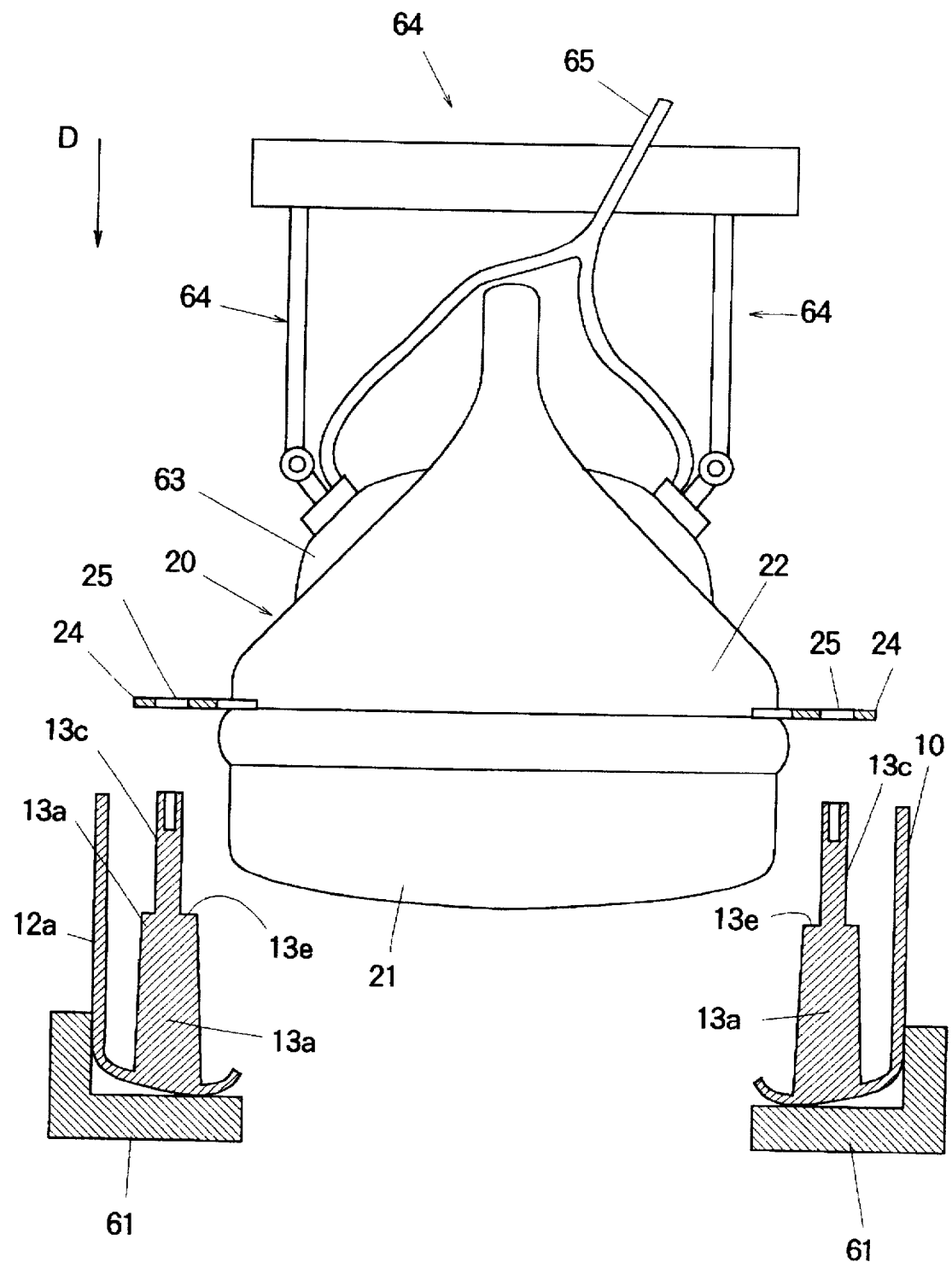
FIG. 8 is a sectional view illustrating a first step in a novel assembly method.

Referring to FIG. 8, to assemble the invented display device, the front cabinet 10 is preferably placed face-down (front side down) on a supporting structure 61 which supports the front cabinet 10 from below.

Next the cathode-ray tube 20 is lowered from above, in the direction of the arrow D, so as to insert the elongate members 13c through the holes 25 in the lugs 24. The cathode-ray tube 20 is preferably held by suction cups 63

(four, for example) attached to its funnel 22. The suction cups 63 are mounted in a carriage 64 adapted for transport in the horizontal and vertical directions, and are collectively coupled to a flexible tube 65 leading to a vacuum pump (not shown). Suction is applied, and the cathode-ray tube 20 is picked up and lowered onto the front cabinet until the lugs 24 are seated on the seating surfaces 13e of the front bosses 13. Then the suction is released (by means, for example, of a valve not shown in the diagram) and the suction cups 63 are withdrawn.

Figure 9:
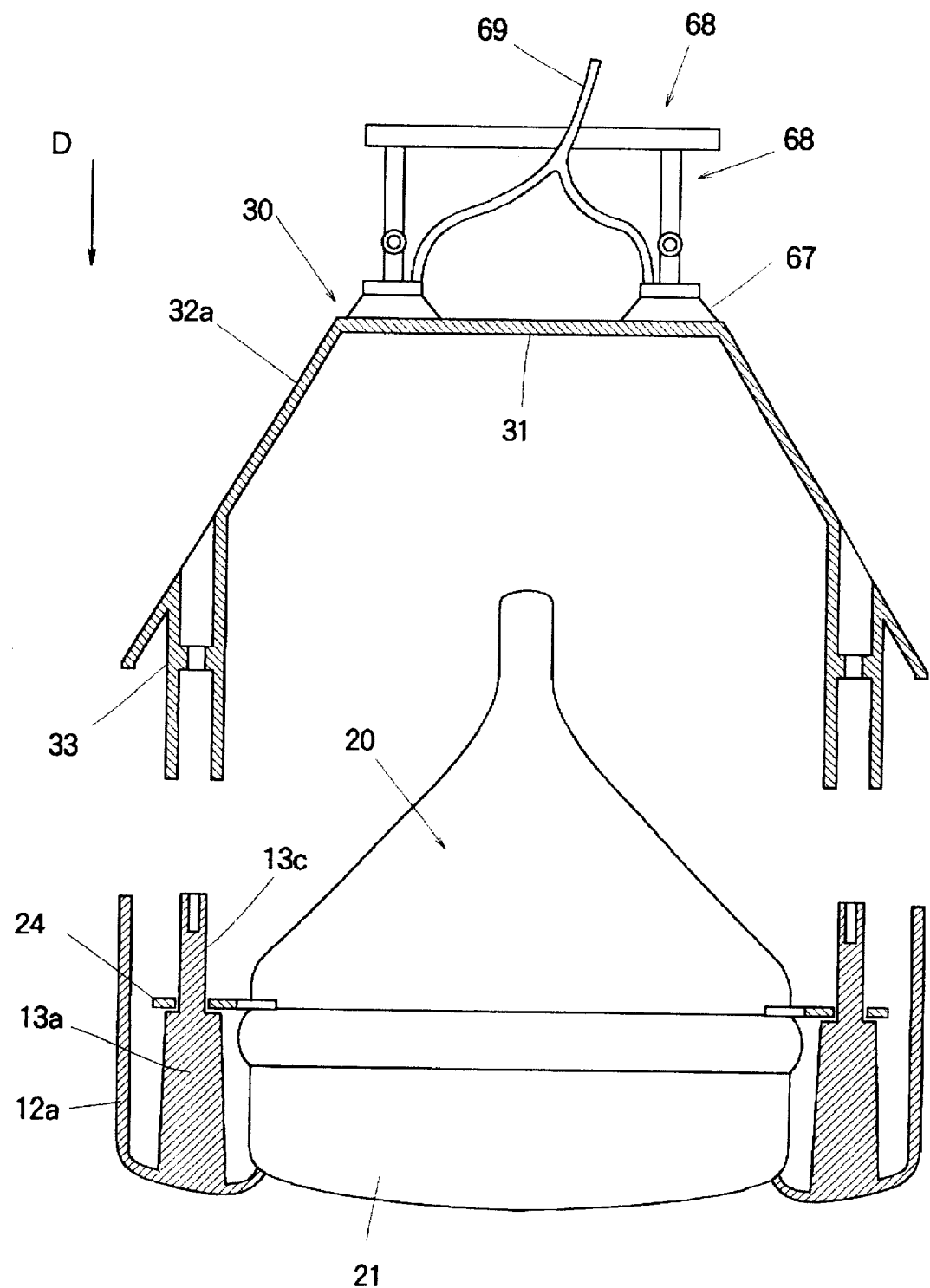
FIG. 9 is a sectional view illustrating a second step in the novel assembly method.

Referring to FIG. 9, next the back cabinet 30 is similarly lowered from above, in the direction of the arrow D, so that the elongate members 13c are inserted into the back bosses 33. The back cabinet 30 is held by, for example, four suction cups 67 attached to its back panel 31. The suction cups 67 are mounted in a carriage 68 adapted for horizontal and vertical transport, and are coupled to a flexible tube 69 leading again to a vacuum pump (not shown) for producing suction. After the back cabinet 30 has been lowered into place, the suction is released and the suction cups 67 are withdrawn.

Figure 10:
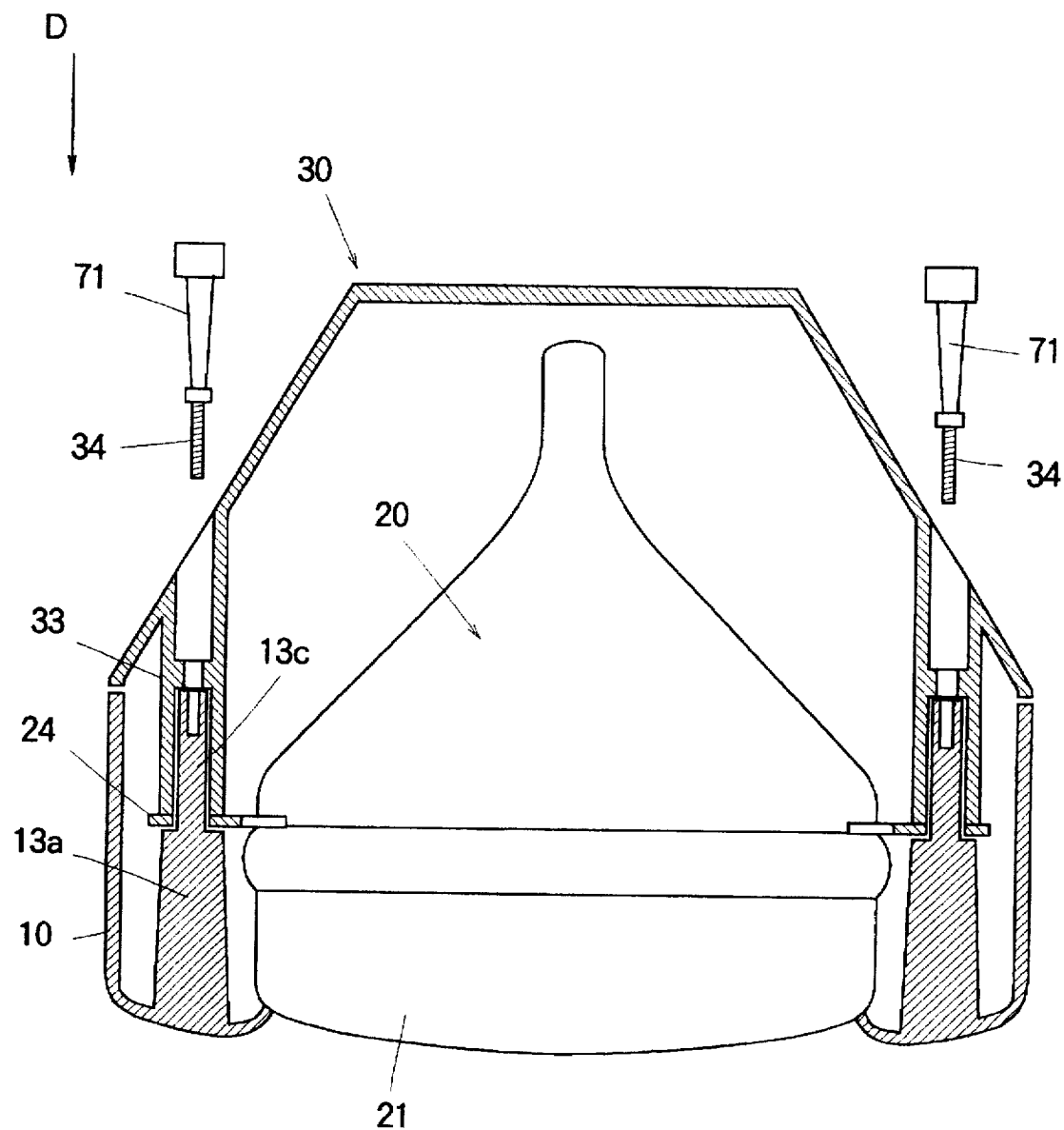
FIG. 10 is a sectional view illustrating a third step in the novel assembly method.

Referring to FIG. 10, the cathode-ray tube 20 and back cabinet 30 are now resting on the front cabinet 10, held in place by gravity, with the elongate members 13c of the front bosses 13 inserted in the back bosses 33. Next the screws 34 are driven by electromagnetic screwdrivers 71 to which the screws 34 are held magnetically. The screwdrivers 71 are supported in an apparatus (not shown) adapted for horizontal and vertical transport. After being brought to the positions shown in the drawing, the screwdrivers 71 are lowered in the direction of the arrow D so that the screws 34 are inserted through the holes in the back bosses 33. The screws 34 are then driven into the tapped holes in the elongate members 13c, after which the electromagnets are switched off and the screwdrivers 71 are withdrawn.

This assembly method has several advantages. One is that it enables the heavy cathode-ray tube 20, which has an unwieldy shape, to be held securely by the suction cups 63 in a manner that does not cause undue concentration of stress. The cathode-ray tube 20 can thus be handled safely and with little risk of damage.

Another advantage is that only a single supporting structure 61 is needed, since the cathode-ray back cabinet back cabinet 30 are held in place by gravity during the assembly job. Moreover, the elongate members 13c prevent the lugs 24 from slipping off the front bosses 13.

Yet another advantage is that screws cannot be dropped inside the cabinet, because the cabinet is closed before any screws are driven.

A further advantage of the invented display device, from the standpoint of assembly, is that insertion of the elongate members 13c into the back bosses 33 automatically aligns the holes in the back bosses 33 with the tapped holes 13d in the elongate members 13c. Once the elongate members 13c are inserted, alignment cannot be lost during the driving of screws or other steps.

Another major advantage is that there are only four screws to drive, instead of the eight screws of the prior art.

The assembly process described above is accordingly simple, sure, and efficient. No difficult alignments or awkward supporting arrangements are required. The process is highly suitable for automation, e.g. by use of robots.

Figure 11:
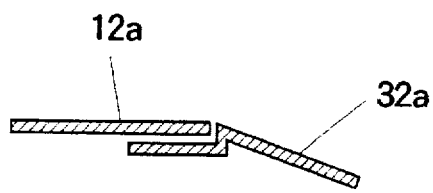
FIG. 11 shows a variation of the structure of the edge of the back cabinet.

Referring to FIG. 11, as a variation of the above embodiment, the front edge of the top panel 32a of the back cabinet can be structured so that it fits inside the back edge of the top panel 12a of the front cabinet, instead of meeting end-to-end. The bottom panel 32b and side panels 32c and 32d can be similarly structured. This structure provides better sealing of the cabinet enclosure.

The first embodiment is well suited for assembly in a face-down position as shown in FIGS. 8 to 10, which has advantages as described above. Factory conditions, however, may require horizontal assembly, and afterward the back cabinet may be removed for servicing while the display device is in a horizontal position. Since the front cabinet 10 and cathode-ray tube 20 are not held together by gravity in this position, it is advantageous to hold them together by additional means. Such means can be provided in various simple ways, not requiring additional screws, as shown in the second, third, and fourth embodiments that follow. These embodiments will be described with reference to FIGS. 12 to 15, using the same reference numerals as in FIGS. 1 to 11 to label identical parts.

2nd Embodiment

Figure 12:
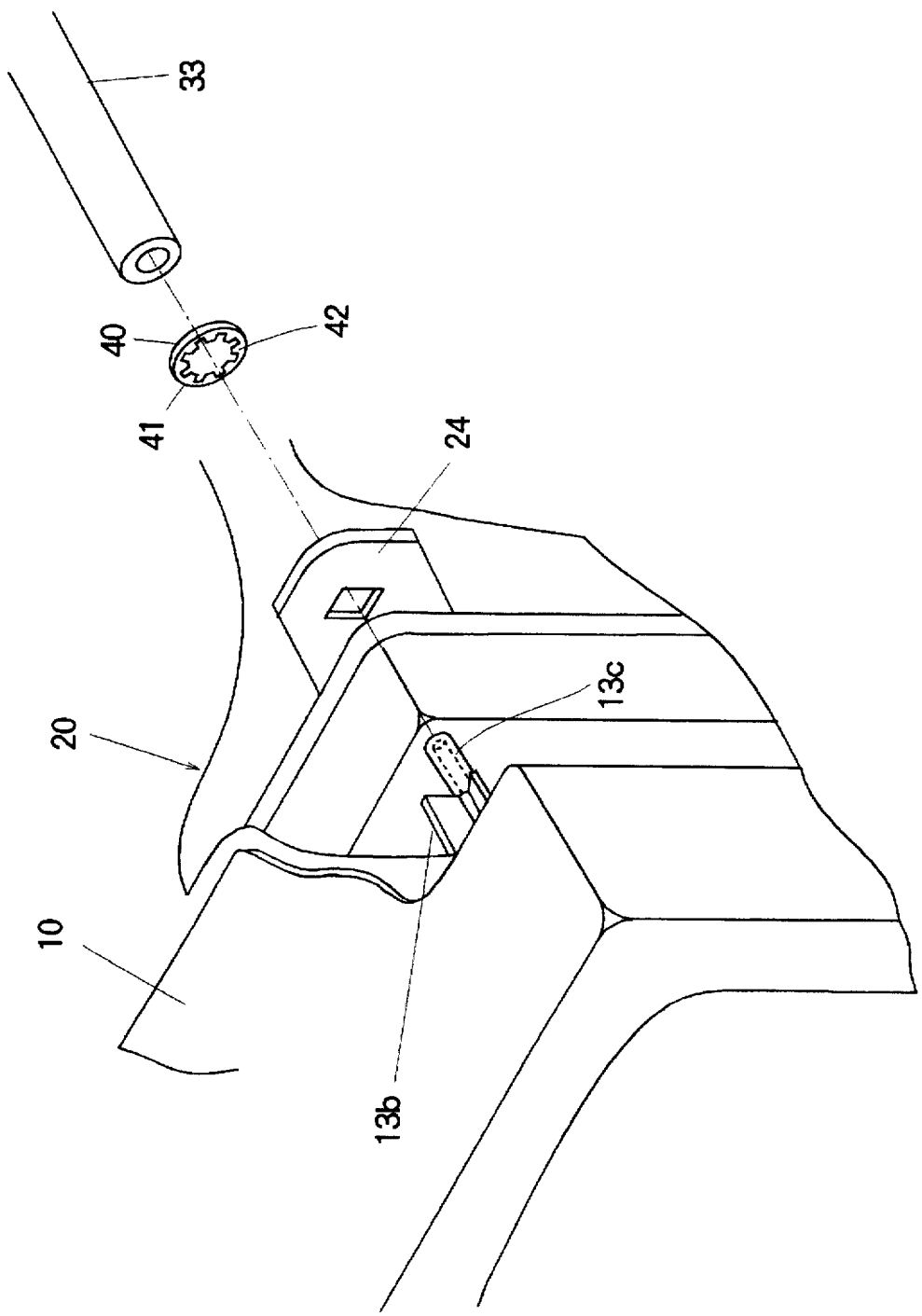
FIG. 12 shows a second embodiment of the invented display device, including a clip washer.

The second embodiment has the same structure as the first embodiment, but includes additional clip washers. Referring to FIG. 12, one of these clip washers 40 is disposed between each lug 24 and back boss 33, fitting over the elongate member 13c of the front boss 13 after it is inserted through the hole 25 in the lug 24. The clip washers 40 have ring-shaped rims 41 with a plurality of elastic teeth-like inward projections 42. The diameter of the circle joining the inner ends of these projections 42 is slightly smaller than the diameter of the elongate members 13c, so the projections 42 are elastically deformed and apply pressure to the elongate members 13c. Because of the grip of this pressure, once fitted onto the elongate members 13c, the clip washers 40 will tend to hold in place. The clip washers 40 can be, for example, molded plastic washers.

Figure 13:
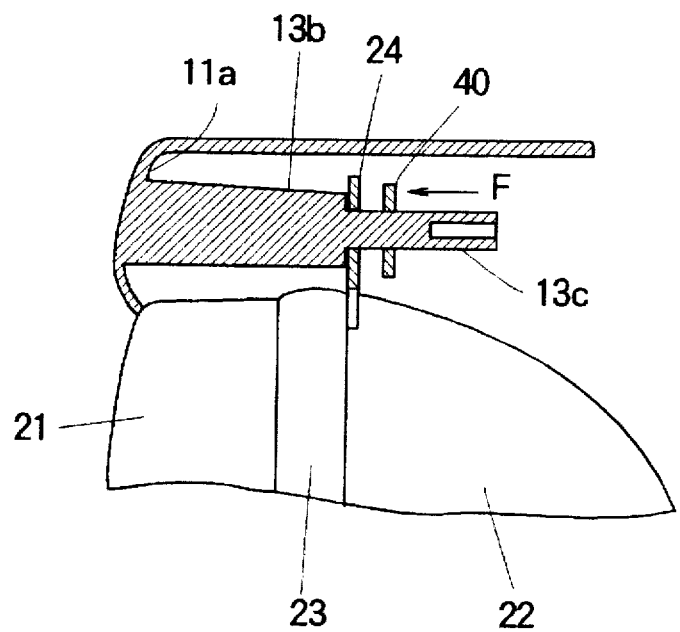
FIG. 13 is a partial sectional view showing the use of the clip washer.

FIG. 13 shows an intermediate state in the assembly process after the elongate members 13c have been inserted through the lugs 24 and the clip washers 40 slipped on, but before the back cabinet has been mounted. The clip washers 40 should be pushed in the direction of the arrow F until they rest against the lugs 24. They will then hold the cathode-ray tube 20 and front cabinet 10 together until the back cabinet is mounted, the lugs 24 being held between the clip washers 40 and the ends of the ribs 13b.

3rd Embodiment

Figure 14:
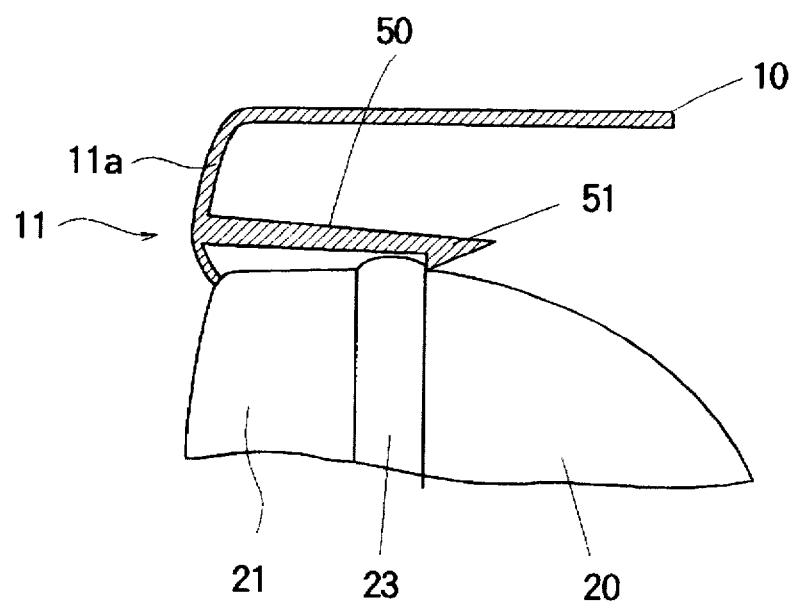
FIG. 14 is a sectional view showing a gripper used in a third embodiment of the invented display device.

Referring to FIG. 14, the third embodiment has the same structure as the first embodiment, but with additional grippers 50. The front ends of these grippers 50 are attached to the inner surfaces of the top part 11a and bottom part 11b (not shown) of the front face 11 of the front cabinet 10. The grippers 51 should be attached near, but slightly displaced from, the positions of the front bosses: for example, at positions slightly inward of the front bosses. (For clarity, the front bosses are omitted from FIG. 14.) The grippers 50 extend backward and terminate in claws 51 that engage the rim band 23 of the cathode-ray tube 20.

The grippers 50 are made of plastic, for example, and are elastically deformable. When the cathode-ray tube 20 and front cabinet 10 have been brought together, the grippers 50 exert an elastic force that presses the claws 51 inward against the cathode-ray tube 20 just behind the rim band 28. The claws 51 thus catch on the rim band 23 and hold the cathode-ray tube 20 in place.

An advantage of the structure in FIG. 14 is that in case of need, the cathode-ray tube 20 can easily be disengaged from the front cabinet 10, by bending the grippers 50 elastically outward. A further advantage is that, since the grippers 50 are attached to the front cabinet 10, they cannot be dropped or lost during assembly or servicing.

4th Embodiment

Figure 15:
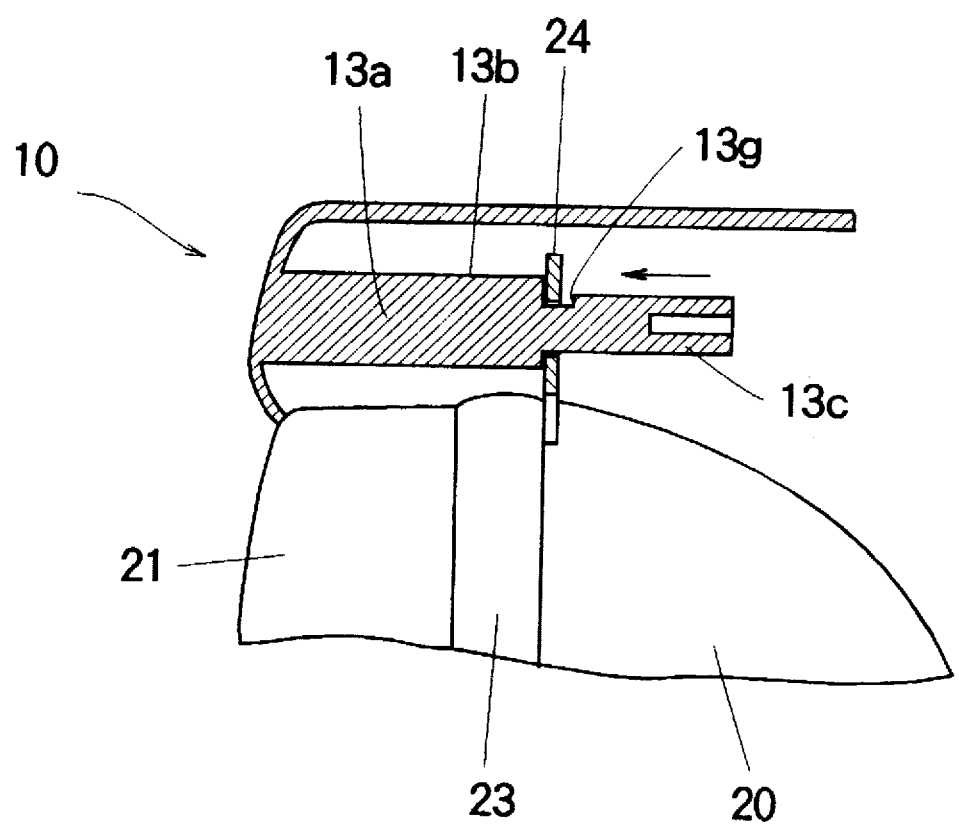
FIG. 15 is a sectional view of a fourth embodiment of the invented display device.
Figure 16:
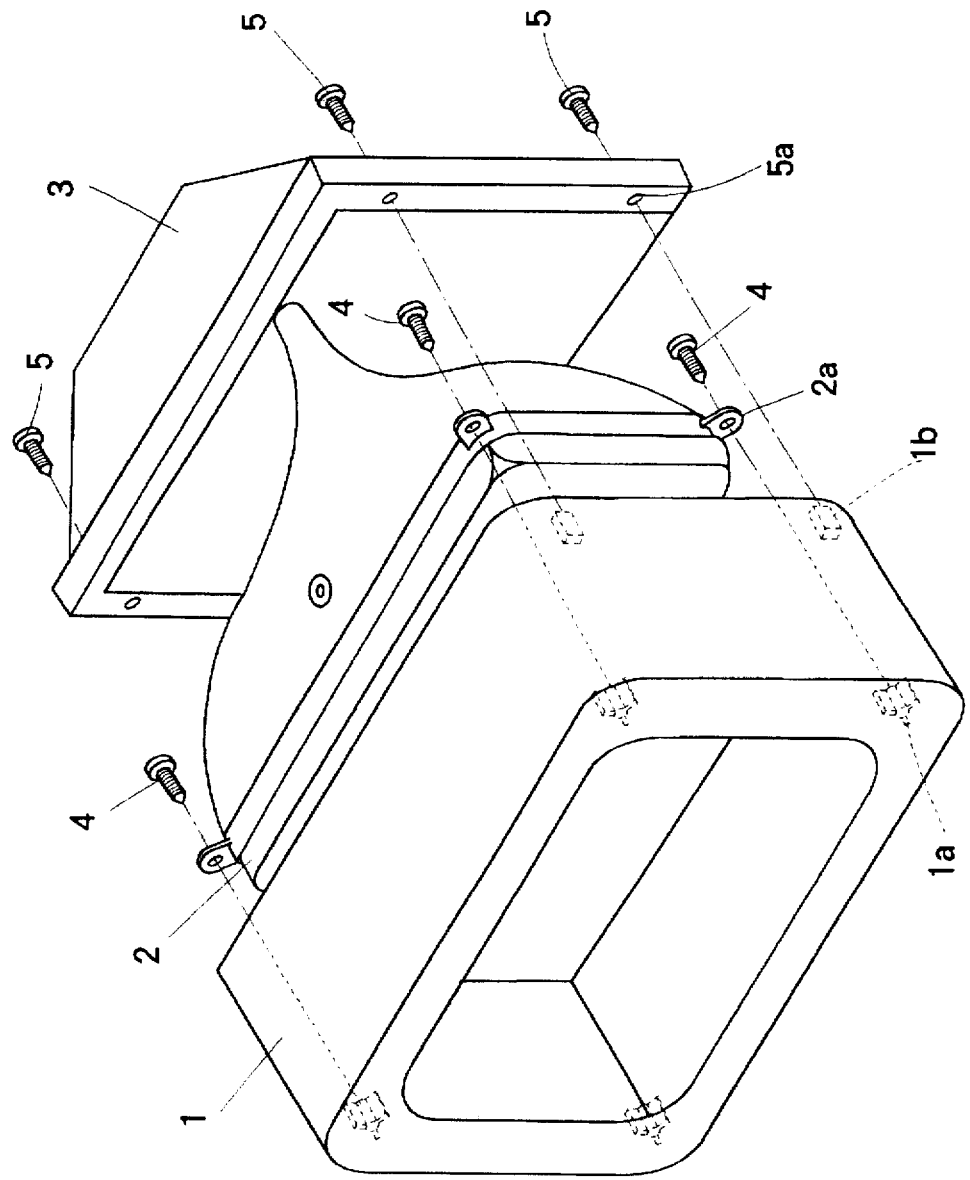
FIG. 16 is an exploded view of a conventional display device.
Figure 17:
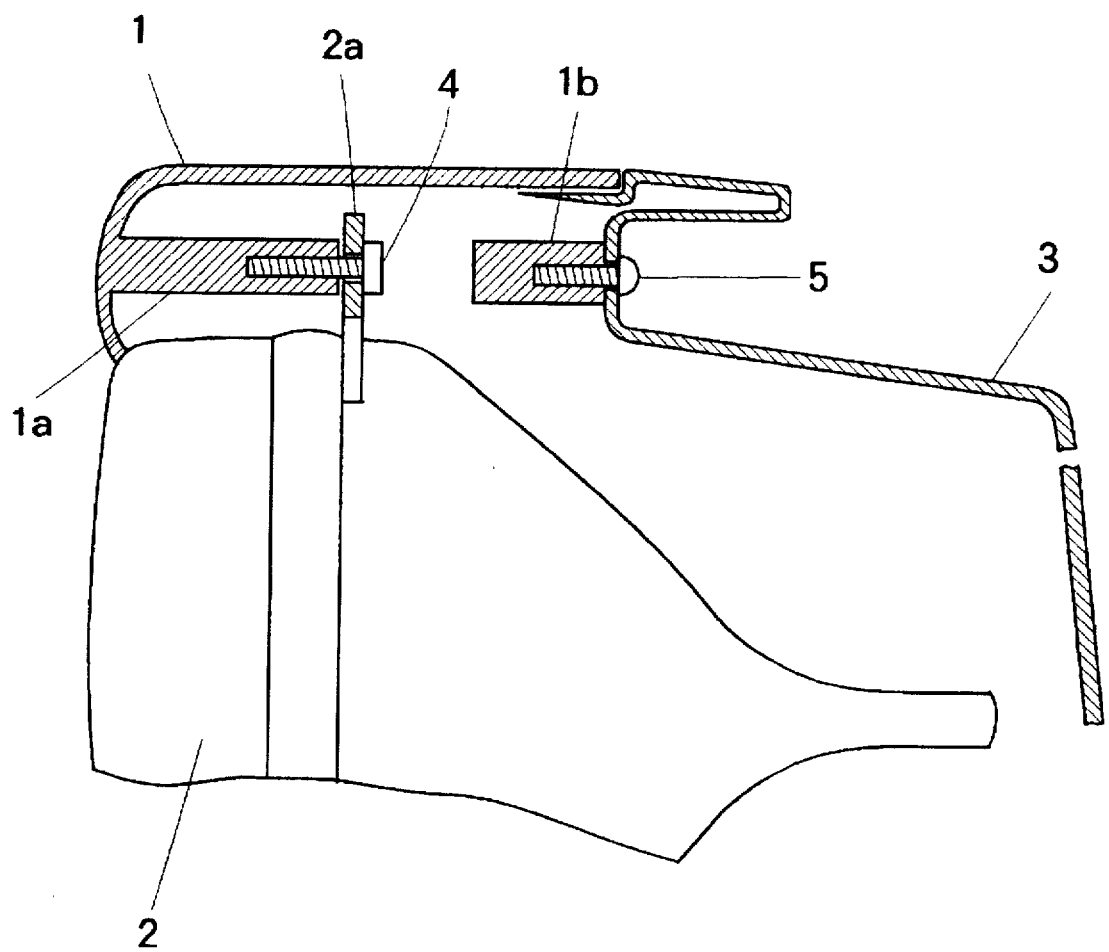
FIG. 17 is a partial sectional view of the conventional display device.

Referring to FIG. 15, the fourth embodiment has the same structure as the first embodiment, except that some or all of the elongate members 13c have notches 13g in which the lugs 24 rest. The notches 13g are formed in the upper surfaces of the elongate members 13c and are located at the bases of the elongate members 13c, where they are attached to the stems 13a of the front bosses, just in front of the ribs 13b. The width of the notches 13g should be substantially equal to the thickness of the lugs 24, or slightly larger. Notches 13g may be provided, for example, on the two upper elongate members 13c, on the two lower elongate members 13c, or on all four elongate members 13c.

When the display device is positioned horizontally with the elongate members 13c of the front bosses inserted through the holes in the lugs 24, even if the back cabinet is removed, gravity holds the lugs 24 in the corresponding notches 13g, thereby preventing the elongate members 13c from escaping from the holes. To separate the cathode-ray tube 20 from the front cabinet 10 in case of need, it suffices to lift the cathode-ray tube 20 slightly upward, disengage the lugs 24 from the notches 13g, and slide the lugs 24 off the elongate members 13c.

If notches 13g are formed in, for example, only the upper two elongate members 13c, the holes in the lower two lugs 24 must not fit too tightly around the lower elongate members 13c. These holes must have enough vertical clearance so that the cathode-ray tube 20 can slide up and down slightly, to let the upper two elongate members 13c slip into and out of their notches 13g.

The fourth embodiment has the same advantages as the third: easy disengagement of the cathode-ray tube from the front cabinet, and no unattached parts to be dropped or lost. The fourth embodiment has the further advantage of not having any extra parts at all, requiring only the formation of notches in existing parts.

The structures shown in the second, third, and fourth embodiments can be used singly, or two or more of them can be used together.

All of the embodiments described above have the advantage of requiring few fastening materials. The first, third, and fourth embodiments require only four screws. The second embodiment requires only four screws and four clip washers.

The invention is riot restricted to bosses with the structures shown in the drawings. The illustrated structure of the front bosses 13, however, is advantageous in that the ribs 13b provide both lightweight strengthening and a seating surface 13e for seating the lugs 24. The illustrated structure of the front bosses 13 is moreover suitable for unitary plastic molding. The front bosses 13 can be formed as part of the front cabinet 10.

In the back bosses 33, although the back cavities 33b are not strictly necessary, they have the advantage of recessing the heads of the screws 34 out of sight. This is a practical as well as an aesthetic advantage, because the recessed screw heads cannot rub against external objects, and because shorter screws can be used.

The elongate members 13c and front cavities 33a need not be cylindrical, but a cylindrical shape aids insertion, as there is no need for rotational alignment. The elongate members 13c need not fit snugly in the front cavities 33a, but a fairly snug fit is desirable so that the front bosses 13 and back bosses 33 can reinforce each other, improving overall structural strength. To facilitate insertion of the elongate members 13c into the front cavities 33a, the front cavities 33a may have flared ends.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A cathode-ray tube display device, comprising:

a cathode-ray tube have peripheral lugs with holes;

a front cabinet having front bosses with elongate members that extend backward thorough the holes in said peripheral lugs and terminate in ends with tapped holes;

a back cabinet having back bosses that extend forward and terminate in ends with front cavities for receiving the ends of said elongate members, said back bosses also having partitions holes, said partitions defining back ends of said front cavities; and screws that are inserted through the holes in said partitions and driven into the tapped holes in said elongate members, thereby fastening said front cabinet, said cathode-ray-tube, and said back cabinet together, wherein at least one of said elongate members has a notch that engages a corresponding one of said peripheral lugs.

2. The device of claim 1,:

said back bosses further including back cavities extending from behind said partitions to an outer surface of said back cabinet; and said screws including heads disposed in said back cavities.

3. The device of claim 1, said front bosses further including seating surfaces making contact with said peripheral lugs, wherein said peripheral lugs are held tightly between said seating surfaces and said ends of said back bosses.

4. The device of claim 3, each of said front bosses further including:

respective stems from which said elongate members extend backward, and ribs surrounding said stems, said ribs terminating in back ends that form said seating surfaces.

5. The device of claim 1, wherein said elongate members and said front cavities are both cylindrical in shape.

6. The device of claim 1, further comprising clip washers disposed between said peripheral lugs and said ends of said back bosses, said clip washers surrounding and gripping said elongate members thereby holding said cathode-ray-tube in place even when said back cabinet is not mounted on said front cabinet.

7. The device of claim 1:

said cathode-ray-tube further including a face plate, a funnel, and a rim band disposed between said face plate and said funnel, creating a projection outward from said funnel; and said front cabinet further including grippers that extend backward and terminate in claws that engage said rim band, thereby holding said cathode-ray-tube in place even when said back cabinet is not mounted on said front cabinet.

8. A method of assembling a display device having a cathode-ray-tube, a front cabinet, and a back cabinet, comprising the steps of:

providing said front cabinet with front bosses having backward-extending elongate members terminating in ends with tapped holes;

providing said cathode-ray-tube with peripheral lugs having holes;

providing said back cabinet with forward-extending back bosses terminating in ends with front cavities, and having partitions with holes, said partitions forming back walls of said front cavities;

inserting said elongate members through said holes in said peripheral lugs;

inserting said elongate members into said front cavities in said back bosses;

inserting screws through said holes in said partitions;

driving said screws into said tapped holes in said elongate members; and providing at least one of said elongate members with a notch; and engaging a corresponding one of said peripheral lugs in said notch after said elongate members have been inserted through the holes in said lugs but before said elongate members have been inserted into the front cavities of said back bosses.

9. The method of claim 8, further comprising the steps of:

providing said back bosses with back cavities extending from behind said partitions to an outer surface of said back cabinet; and inserting said screws into said back cavities and through said partitions.

10. The method of claim 8, further comprising the steps of providing said front bosses with backward-facing seating surfaces, and inserting said elongate members through the hoes in said peripheral lugs until said peripheral lugs rest against said seating surfaces.

11. The method of claim 10, further comprising the step of driving said screws until said peripheral lugs are tightly held between said seating surfaces and said ends of said back bosses.

12. The method of claim 8, further comprising the step of placing said front cabinet face-down before the step of inserting said elongate members through said holes in said peripheral lugs.

13. The method of claim 12, wherein the step of inserting said elongate members through said holes in said peripheral lugs is carried out by lowering said cathode-ray-tube onto said front cabinet from above.

14. The method of claim 13, further comprising the step of holding the cathode-ray-tube with suction cups attached to a funnel of the cathode-ray tube and lowering the cathode-ray-tube onto said front cabinet.

15. The method of claim 12, wherein said step of inserting said elongate members into said front cavities of said back bosses includes a step of lowering said back cabinet onto said front cabinet and said cathode-ray-tube from above.

16. The method of claim 15, wherein said step of lowering said back cabinet onto said front cabinet includes a step of holding said back cabinet with suction cups.

17. The method of claim 12, wherein said steps of inserting said screws and driving said screws include steps of inserting said screws vertically from above and driving said screws vertically from above.

18. The method of claim 8, comprising the additional step of fitting clip washers onto said elongate members after said elongate members have been inserted through the holes in said lugs but before said elongate members have been inserted into the front cavities of said back bosses, to hold said front cabinet and said cathode-ray tube together.

19. The method of claim 8, comprising the additional steps of:

providing said cathode-ray tube with a rim band;

providing said front cabinet with grippers extending backward and terminating in claws; and engaging said claws on said rim band after said elongate members have been inserted through the holes in said lugs but before said elongate members have been inserted into the front cavities of said back bosses, to hold said front cabinet and said cathode-ray tube together.

\* \* \* \* \*